United States Patent
Kruglick (10) Patent No.: US 9,671,850 B2
(45) Date of Patent: Jun. 6, 2017

(54) LEAKAGE CURRENT VARIABILITY BASED POWER MANAGEMENT

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 157 days.

(21) Appl. No.: 14/325,280

(22) Filed: Jul. 7, 2014

(65) Prior Publication Data

US 2016/0004288 A1 Jan. 7, 2016

(51) Int. Cl.
G06F 1/32 (2006.01)

(52) U.S. Cl.
CPC .......... *G06F 1/3203* (2013.01); *G06F 1/3206* (2013.01)

(58) Field of Classification Search
CPC ............ G06F 17/5068; G06F 2217/78; G06F 17/5063; G06F 1/206; G06F 1/3206
See application file for complete search history.

(56) References Cited

U.S. PATENT DOCUMENTS

| | | | |
|---|---|---|---|
| 8,595,520 B2 | 11/2013 | Li et al. | |
| 9,508,607 B2 * | 11/2016 | Chua-Eoan | H01L 23/34 |
| 2005/0044515 A1 * | 2/2005 | Acar | G06F 17/5022 |
| | | | 716/109 |
| 2010/0287604 A1 * | 11/2010 | Potkonjak | G06F 21/73 |
| | | | 726/6 |
| 2012/0053897 A1 * | 3/2012 | Naffziger | G06F 1/3206 |
| | | | 702/182 |
| 2012/0260117 A1 * | 10/2012 | Acar | G06F 1/3243 |
| | | | 713/340 |
| 2015/0094995 A1 * | 4/2015 | Allen-Ware | G06F 11/3006 |
| | | | 703/2 |

FOREIGN PATENT DOCUMENTS

EP 2664977 A2 11/2013

OTHER PUBLICATIONS

"Mac Pro Late 2013 Teardown," Accessed at http://web.archive.org/web/20140302031353/http://www.ifixit.com/Teardown/Mac+Pro+Late+2013+Teardown/20778, Accessed on Jul. 3, 2014, pp. 18.

(Continued)

*Primary Examiner* — Mohammed Rehman
*Assistant Examiner* — Alyaa T Mazyad
(74) *Attorney, Agent, or Firm* — Turk IP Law, LLC (57) ABSTRACT

Technologies are generally described to provide a leakage current variability based power management of a processor. According to some examples, instruction counters and aggregated power consumption of the processor may be used to process power measurements of the processor into linear equations. The linear equations may be processed to produce a set of leakage values for the processor. In an example scenario, computation data from a power controller and processor instruction counters (PICs) of a core of the processor may be used to determine the leakage current variability of the core. A table of linear combination samples may be generated from the computation data. A micro-architectural leakage map of the core may be generated from the linear combination samples within the table.

22 Claims, 7 Drawing Sheets

(56) References Cited

OTHER PUBLICATIONS

Anand, A., "Managing Leakage—A Challenge for Designers at Lower Technology Nodes," Jan. 2012, Accessed at http://web.archive.org/web/20140210071859/http://www.elitequill.com/managing-leakage-a-challenge-for-designers-at-lower-technology-nodes/, Accessed on Jul. 3, 2014, pp. 6.

Anis, M. and Aburahma, M. H., "Leakage Current Variability in Nanometer Technologies," Proceedings of the 9th International Database Engineering & Application Symposium, pp. 60-63 (2005).

Capodieci, L. et al., "Toward a Methodology for Manufacturability-driven Design Rule Exploration," In Proceedings of the 41st Annual Design Automation Conference, pp. 311-316 (2004).

Choi, J. et al., "Thermal-aware task scheduling at the system software level," Proc. IEEE/ACM Int. Symp. Low Power Electron. Design, pp. 213-218 (2007).

Gupta, P. and Gupta R. K., "Underdesigned and Opportunistic Computing," In 20th Asian Test Symposium (ATS), pp. 498-499 (2011).

Gupta, P. et al., "Underdesigned and Opportunistic Computing in Presence of Hardware Variability," IEEE Transactions on Computer-Aided Design of Integrated Circuits and Systems, vol. 32, No. 1, Jan. 2013, pp. 8-23.

Iyer, A. and Marculescu, D., "Power efficiency of Multiple Clock, Multiple Voltage Cores," in Proc. IEEE/ACM Intl. Conf. on Computer-Aided Design, pp. 379-386 (2002).

Jeong, K., "Impacts of guardband reduction on design process outcomes: A quantitative approach," IEEE Trans. Semicond. Manuf., vol. 22, No. 4, pp. 552-565, (2009).

Kim, C. H. et al., "On-die CMOS leakage current sensor for measuring process variation in sub-90nm generations," Symposium on VLSI Circuits, 2004, Digest of Technical Papers, pp. 250-251, Jun. 2004.

Lackey, D. E., "Managing Power and Performance for System-on-Chip Designs using Voltage Islands," IEEE, (2002).

Liang, X. et al., "ReVIVaL: A Variation-Tolerant Architecture Using Voltage Interpolation and Variable Latency," In 35th International Symposium on Computer Architecture, pp. 191-202 (2008).

Marculescu, D. and Talpes, D., "Variability and Energy Awareness: a Microarchitecture-level Perspective," In Design Automation Conference, Proceedings 42nd, pp. 11-16 (2005).

Miller, T. R. et al., "Mitigating the Effects of Process Variation in Ultra-low Voltage Chip Multiprocessors Using Dual Supply Voltages and Half-Speed Units," Computer Architecture Letters, vol. 11, No. 2, pp. 45-48 (2012).

Pant, A. et al., "Software Adaptation in Quality Sensitive Applications to Deal with Hardware Variability," In Proceedings of the 20th Symposium on Great Lakes Symposium on VLSI, pp. 85-90, (2010).

Powell, M. et al., "Architectural Core Salvaging in a Multi-core Processor for Hard-error Tolerance," In Proceedings of the 36th Annual International Symposium on Computer Architecture, pp. 93-104 (2009).

Reddi, V. J. et al., "Software-assisted hardware reliability: Abstracting circuit-level challenges to the software stack," in Proc. IEEE/ACM Design Automat. Conf., Jul. 2009, pp. 788-793.

Rotem, E. et al., "Power Management Architecture of the Second Generation Intel Core Microarchitecture," Intel Session 9, Hot Chips, vol. 23, Aug. 19, 2011, pp. 33.

Semeraro, G. et al., "Dynamic Frequency and Voltage Control for a Multiple Clock Domain Microarchitecture," in Proc. ACM Intl Symp. on Microarchitecture, Nov. 2002, pp. 356-367.

Seok, M. et al., "CAS-FEST 2010: Mitigating Variability in Near-Threshold Computing," IEEE Journal on Emerging and Selected Topics in Circuits and Systems, vol. 1, No. 1, Mar. 2011, pp. 42-49.

Sharma, A. et al., "Towards Analyzing and Improving Robustness of Software Applications to Intermittent and Permanent Faults in Hardware," IEEE 31st International Conference on Computer Design (ICCD), pp. 435-438 (2013).

Talpes, E. and Marculescu, D., "A Critical Analysis of Application-Adaptive Multiple Clock Processors," in Proc. ACM/IEEE Intl. Symp. on Low Power Electronics and Design, pp. 278-281 (2003).

Teodorescu, R et al., "Mitigating parameter variation with dynamic fine-grain body biasing," in International Symposium on Microarchitecture, Dec. 2007, pp. 27-39.

\* cited by examiner

| CONSOLIDATED POWER | FP DIV | FP MUL | FP ROM | INT MUL | INT DIV | INT SHUF | SISHIFT | INT SLOW | TLB | L1D | L1I | LSQ | ROB | INORD |
|---|---|---|---|---|---|---|---|---|---|---|---|---|---|---|
| 0.15 | 0.06 | 0.01 | 0.08 | 0.06 | 0.14 | 0.12 | 0.14 | 0.01 | 0.13 | 0.09 | 0.09 | 0.07 | 0.02 | 0 |
| 0.81 | 0.29 | 0.53 | 0.23 | 0.76 | 0.11 | 0.43 | 0.24 | 0.81 | 0.16 | 0.33 | 0.11 | 0.49 | 0.31 | 0.35 |
| 0.98 | 0.81 | 0.2 | 0.23 | 0.98 | 0.02 | 0.22 | 0.15 | 0.05 | 0.42 | 0.28 | 0.11 | 0.65 | 0.61 | 0.94 |

210 ↗    222 ↘

| FP DIV | FP MUL | FP ROM | INT MUL | INT DIV | INT SHUF | SISHIFT | INT SLOW | TLB | L1D | L1I | LSQ | ROB | INORD |
|---|---|---|---|---|---|---|---|---|---|---|---|---|---|
| 0.88 | 0.43 | 0.24 | 0.54 | 0.26 | 0.17 | 0.63 | 0.54 | 0.26 | 0.16 | 0.76 | 0.09 | 0.96 | 0.85 |

LEAKAGE CURRENT VARIABILITY BASED POWER MANAGEMENT

BACKGROUND

Unless otherwise indicated herein, the materials described in this section are not prior art to the claims in the application and are not admitted to be prior art by inclusion in this section.

Modern processors are products of iterative scale down of fabrication processes. Smaller fabrication processes have allowed more transistors to be inserted to a similar surface area compared to a processor produced by a previous fabrication process. Additional transistors have allowed modern processors to provide additional computation capacity using a similar power envelope compared to a previous generation processor.

A larger share of power consumption in modern processors is caused by leakage current. Increased leakage current is a byproduct of continued shrinkage of gate dimensions associated with the modern processors. Leakage current was irrelevant to power usage at 1 micron gates used in legacy fabrication processes. A third of the power usage was consumed by leakage current at fabrication processes that used 180 nm gates. In modern processors that are built using fabrication processes that use 65 nm gates or below, leakage current may exceed power used by computation. In addition, the leakage current variability has also increased dramatically in modern processors.

SUMMARY

The present disclosure generally describes methods, apparatus, systems, devices, and/or computer program products related to a leakage current variability based power management.

According to some examples, methods to provide a leakage current variability based power management are described. An example method may include receiving computation data from a power controller and one or more processor instruction counters (PICs) of a core of a processor; generating a table of linear combination samples from the computation data; and generating a micro-architectural leakage map of the core from the linear combination samples within the table.

According to other examples, a system to provide a leakage current variability based power management is described. The system may include a memory and a processor coupled to the memory, where the processor includes one or more cores and is configured to execute a power management application in conjunction with instructions stored in the memory. The power management application may be configured to: receive computation data from a power controller and one or more processor instruction counters (PIC) of one of the one or more cores of the processor; generate a table of linear combination samples from the computation data, where the one or more instructions are grouped based on a sub-unit of the core associated with each one of the one or more instructions; and generate a micro-architectural leakage map of the core from the linear combination samples within the table.

According to further examples, a non-transitory computer-readable storage medium with instructions stored thereon to provide a leakage current variability based power management is described. The instructions, in response to execution by a processor, may cause the processor to: receive computation data from a power controller and one or more processor instruction counters (PIC) of one of the one or more cores of the processor; generate a table of linear combination samples from the computation data, where the one or more instructions are grouped based on a sub-unit of the core associated with each one of the one or more instructions; and generate a micro-architectural leakage map of the core from the linear combination samples within the table.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

The disclosure is generally drawn, inter alia, to methods, apparatus, systems, devices, and/or computer program products related to a leakage current variability based power management.

Briefly stated, technologies are generally described to provide a leakage current variability based power management of a processor. According to some examples, instruction counters and aggregated power consumption of the processor may be used to process power measurements of the processor into linear equations. The linear equations may be processed to produce a set of leakage values for the processor. In an example scenario, computation data from a power controller and processor instruction counters (PICs) of a core of the processor may be used to determine the leakage current variability of the core. A table of linear combination samples may be generated from the computation data. A micro-architectural leakage map of the core may be generated from the linear combination samples within the table.

Figure 1:
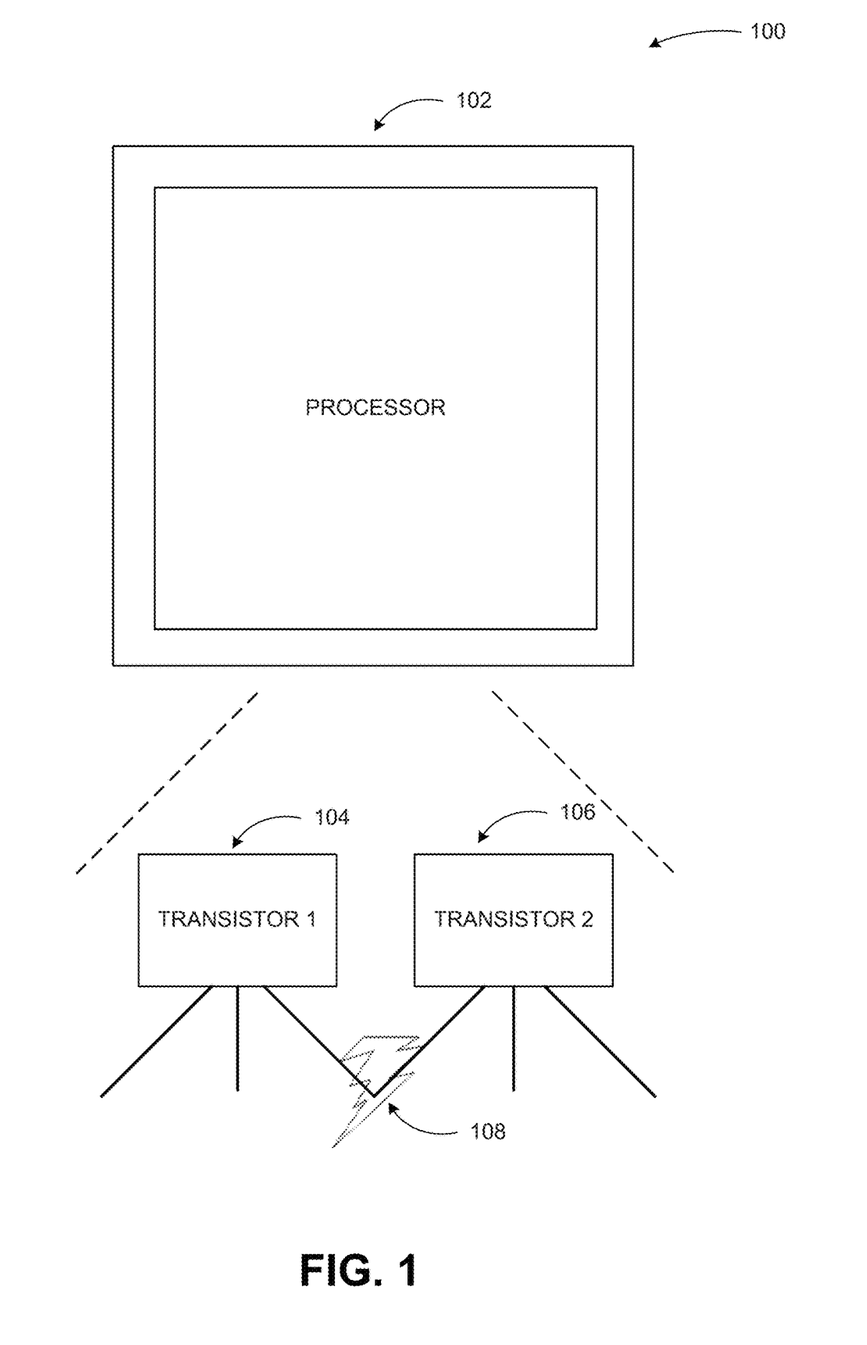
FIG. 1 is an example high level diagram illustrating a leakage of a current at a processor.

FIG. 1 is an example high level diagram illustrating a leakage of a current at a processor, arranged in accordance with at least some embodiments described herein.

As shown in a diagram 100, a processor 102, also known as a central processing unit (CPU), may be a component of a computing device that executes instructions stored in a memory or a storage of the computing device. The processor 102 may include one or more cores. A core may be an execution component of the processor 102. In an example, the processor 102 may include four cores each of which may be configured to execute one or more threads of instructions simultaneously in a multi-threaded computing environment.

The processor 102 may execute instructions retrieved from a memory of the computing device to allow the computing device to perform one or more tasks. Each instruction may include commands to activate or deactivate series of transistors of the processor 102. In an example scenario, a transistor 1 (104) may be connected to a transistor 2 (106) at a connection 108. Transistors and similar components on integrated semiconductor devices such as memories and processors, as well as connections between those components may be subject to leakage current. There are a variety of leakage current types (e.g., sub-threshold leakage current, tunneling leakage current, and the like), and a majority of leakage may be at the junctions. The connection 108 may be one source of leakage current during execution of an instruction that activates or deactivates the transistor 1 (104) and the transistor 2 (106), for example. Some leakage currents may be correlated with a type of the fabrication process. For example, the leakage current may increase with scaling down of the integrated circuit (IC) fabrication as higher number of transistors (or other components) are formed in a fixed area of the IC (e.g., processor 102). In other examples, leakage current may be correlated with operational parameters. For example, the leakage current may increase as a transistor threshold voltage is minimized. Additional transistors may allow the processor 102 to provide additional processing capacity. However, scaling of the IC to achieve smaller gate lengths may affect the leakage current inversely. As a result, power consumption by the processor 102 may be adversely affected through increased leakage current.

New material and fabrication issues may arise in response to a scale down of complementary metal oxide semiconductor (CMOS) technology used in the fabrication of ICs. The scale down may cause a high variation in an amount of the leakage current that flows in transistors such as the transistor 1 (104) and the transistor 2 (106). The variation may occur within a die that encompasses the IC (e.g., processor 102 or one or more cores of the processor 102). Example causes of the variation may include an increase in importance of a line-edge roughness (LER) and random-dopant fluctuations at the channels of the transistors. In addition, a number of dopant atoms in the channel may be less than one hundred at some of the finest line widths used by a modern fabrication processes. The number of dopant atoms may also impact the variation in the leakage current associated with the processor 102.

Variation in the leakage current may be addressed by process, device, and/or circuit designers of the processor 102. The variation in the leakage current at the processor 102 may be managed through a higher layer of abstraction of software for the processor 102 such as OS level tasks, virtual machine manager, or microcode, in some examples. In an example scenario, software schemes may be used to address variations in voltage or temperature of the processor 102 through deactivation of sub-units of the processor 102. As such, an ability to deactivate the sub-units across one or more cores of the processor 102 may be considered as an undesirable fault condition. As a result, an application may be allowed to deactivate the sub-units when the application accepts some error conditions.

According to some examples, a planning table of core sub-unit leakage powers may be used to perform power planning of the processor 102. The power planning may compensate the variation in leakage current between cores of the processor 102. In an example scenario, a floating point sub-unit (FPU or FP ALU), with a leakage current that exceeds a threshold, may be selected to be deactivated for an application that utilizes the FPU below another threshold. A power saving from the deactivated FPU may be greater than a power necessary to operate a core of the processor 102 at a faster clock speed to compensate for slower operations associated with the deactivated FPU. A result of the power savings may include a reduced power consumption with equal or greater performance at the processor 102.

A power management scheme, according to an example, may need to take into account power savings in a leakage power associated with a sub-unit of the processor 102 to determine an effectiveness of gating the sub-unit. A gate may be used to activate and deactivate the sub-unit. The leakage power may demonstrate a difference between a power consumption of an unused sub-unit and a power-gated sub-unit. The difference may vary by a factor of 10× in some examples. The range in the difference may determine whether power gating may include a power saving or a power loss at the processor 102 for a particular usage scenario. The uncertainty associated with the range may prevent effective sub-unit power gating of the processor 102.

The leakage power used by a sub-unit may be variable based on fabrication tolerances. However, the leakage current of a sub-unit may be more stable after fabrication of the processor 102. As such, the leakage current of the sub-unit may be illustrated rarely. As a result, a modern processor may not have actual power measurements of the sub-units. Power measurement may be available at a processor level or core level. Therefore, extraction of real sub-unit leakage power data of the processor 102 may not be possible. In some examples, the computation for power management may be performed in another server or another processor. For example, a group of processors may send their power data to a manager that may reside on a centralized server or processor.

Figure 2A:
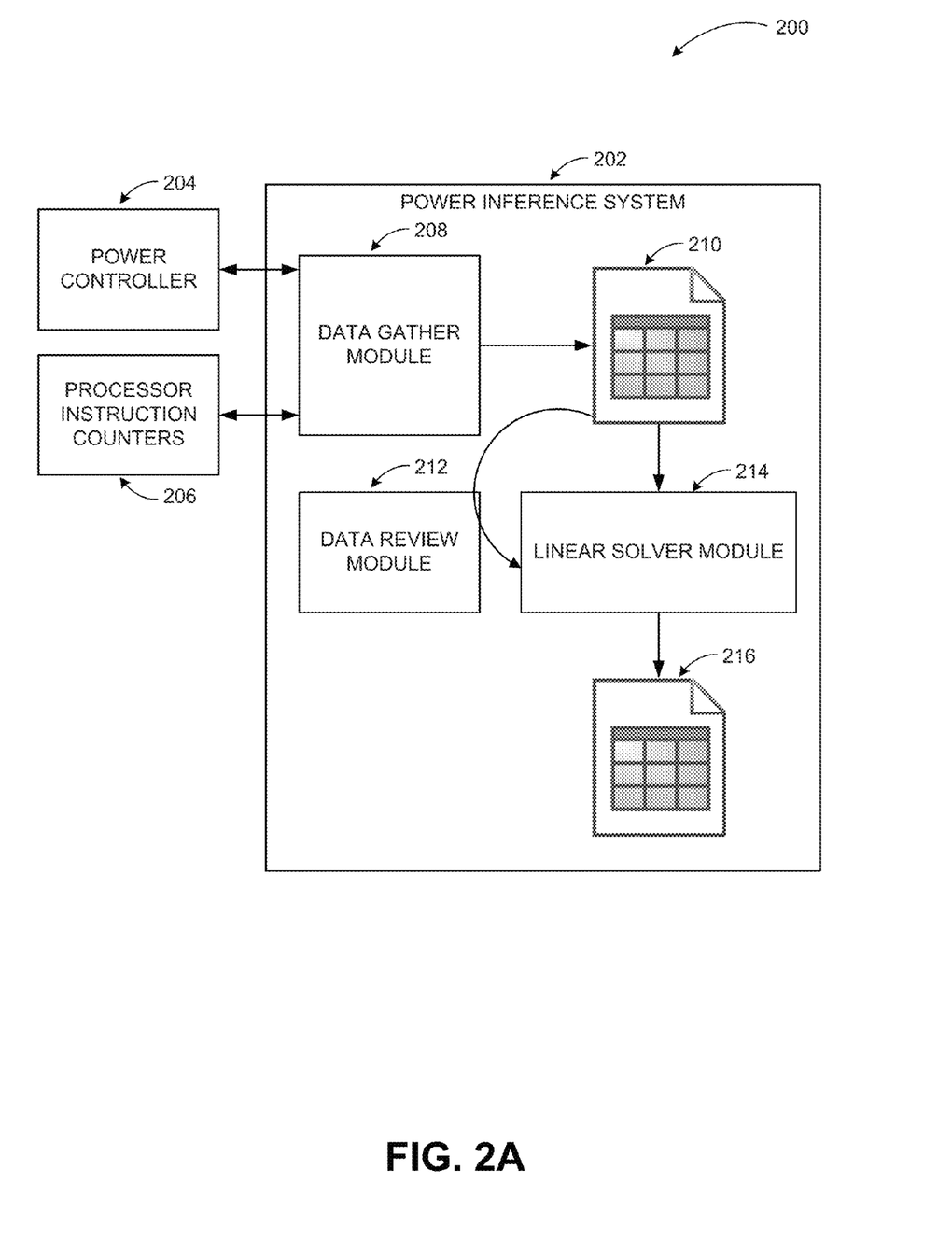
FIGS. 2A and 2B illustrate an example component diagram of a power interference system that provides a leakage current variability based power management.
Figure 2B:
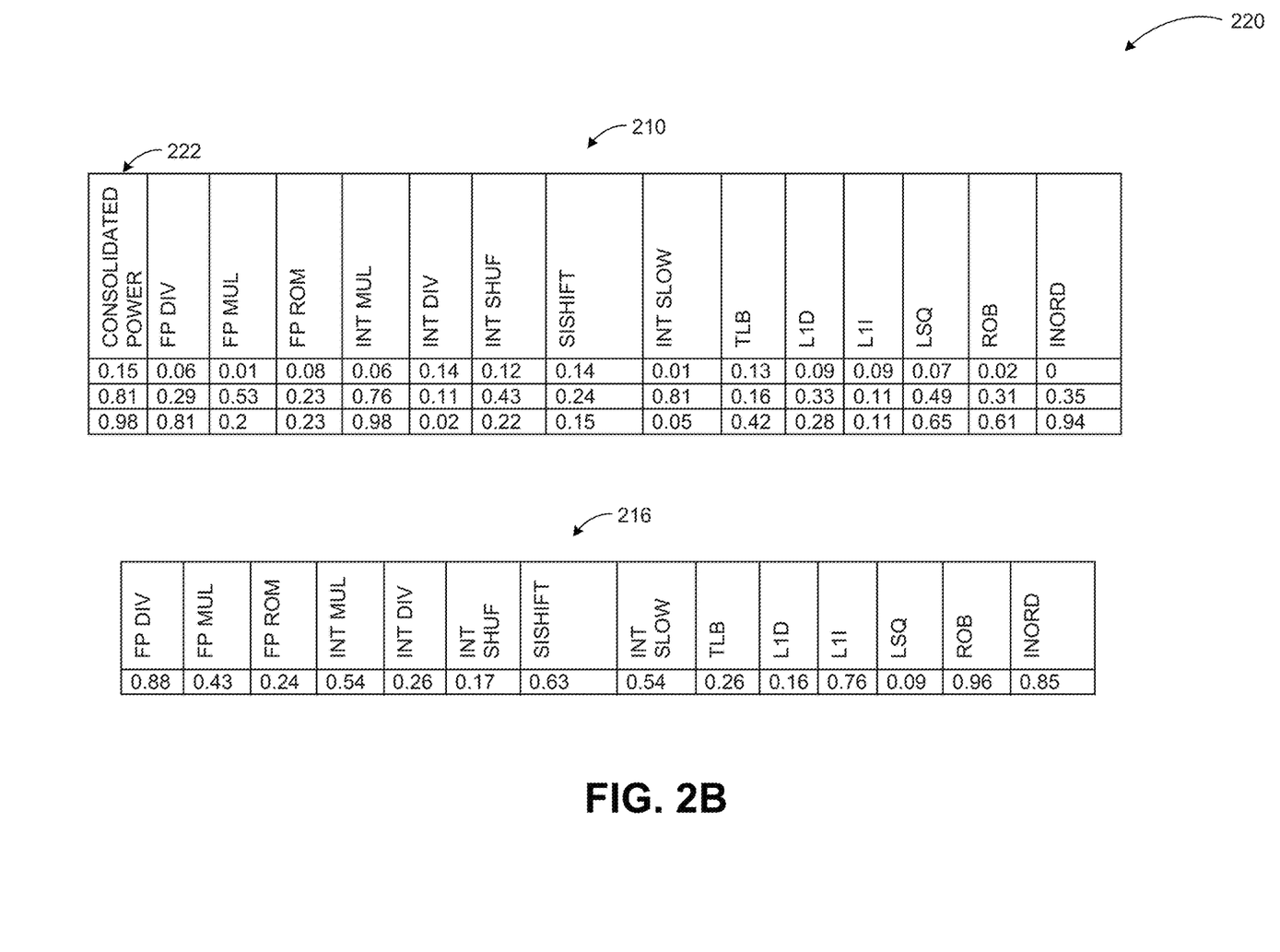

FIGS. 2A and 2B illustrate an example component diagram of a power inference system that provides a leakage current variability based power management, arranged in accordance with at least some embodiments described herein.

As shown in a diagram 200, an example system for gathering micro-architectural leakage power maps for leakage variability driven software power management may include a power inference system 202. The power inference system 202 may include a data gather module 208, which may interact with a power controller 204 and processor instruction counters 206. The data gather module 208 may gather data to extract processor sub-unit leakage power consumption, which may vary by an order of magnitude or more and may be a large portion of chip power at the smaller gate channel lengths. The data gather module 208 may gather matching data from the power controller 204 and the processor instruction counters 206 representing computation over a certain time period. These two inputs may become the consolidated power column 222 of table 210 and relative usage of each processor sub-unit in a single linear combination sample in the table 210 of such samples.

Samples of the instructions and the power usage may be gathered from sub-units to determine the leakage current when unused. A sub-unit is unused during the time it is not actively processing instructions. In an unused state, the sub-unit may consume leakage power. The linear matrix operations may produce accurate measurements of dynamic power usage and leakage power usage of the processor. Example sub-units may include, but are not limited to, FPU, INT-ALU, L1 cache, and others. Each instruction typically has a known relation to the number and type of operations that may be performed by each sub-unit. For example a processor instruction de-code unit may convert an instruction to multiple "micro-ops" that are each a known discrete set of logic operations on known sub-units. A floating point multiplication, for example, may include a certain number of operations in the floating point unit (FPU) and a certain number of memory operations associated with registers or memory.

In an example implementation, the samples in the table 210 may indicate a normalized consolidated power and usage (with "1" as maximum value), with numbers in each instruction class column representing the proportion of use (or unused) of that instruction or class of instructions (from the processor instruction counters 206 data).

In some embodiments, the instructions may be grouped according to the processor sub-unit they use. A data review module 212 may assess data for completeness such as noting when the number of equations exceeds the number of unknowns and triggers linear solver module 214. The linear solver module 214 may be triggered when there is sufficient data, available processing, and a suitable time or circumstance for recalculating leakage power, for example. The output of the linear solver module 214 may be a micro-architectural leakage map 216 that reflects the actual leakage power of each processor sub-unit, thus capturing the impact of fabrication variability. In many cases the linear solver may use common linear solving techniques like matrix operations, for example the Gauss-Jordan method. In some cases there may be additional nonlinear terms, for example related to the voltage status of neighboring modules or temperature, which may be addressed using non-linear solving in linear solver module 214. Non-linear solving technique examples include differential equations (ordinary and partial), and may include an initial simplification of a more complex phenomena using Taylor expansion or other transformation.

The leakage map 216 may be recalculated over different operating temperatures in some embodiments, and values may be stored. If the values are subject to drift, they may be re-measured after intervals such as days or weeks. Other triggers may include changing of cores or virtual machine placement or reconfiguration of processors. In some cases, sub-unit leakage power may also be altered by the deactivations of physically nearby but logically separate circuits because of changes in substrate voltage, so power management of nearby cores may trigger data gathering as well.

Decreasing the processing in one sub-unit or turning the sub-unit off may be more than compensated by increasing the overall processing of a core (e.g. increasing clock frequency). A processor may turn each instruction into variable numbers of micro-operations that may be performed by processor sub-units. Cores with reduced capabilities, turned off sub-units, or faults may then still perform a given operation like floating point computation (it may take more computations or steps than on a core with dedicated processing capability). In other scenarios, a specific sub-unit deactivation that cannot be compensated for by other sub-units may result in a thread migrating, performing the operation, and moving back. In any of these cases there may be a finite and calculable power cost to working without each sub-unit of the processor. With the core-specific micro-architectural leakage map provided by the micro-architectural sub-unit power inference system described above, software management may compare and manage the tradeoff of leakage and sub-unit turn-off management in a processor according to some embodiments.

Figure 3:
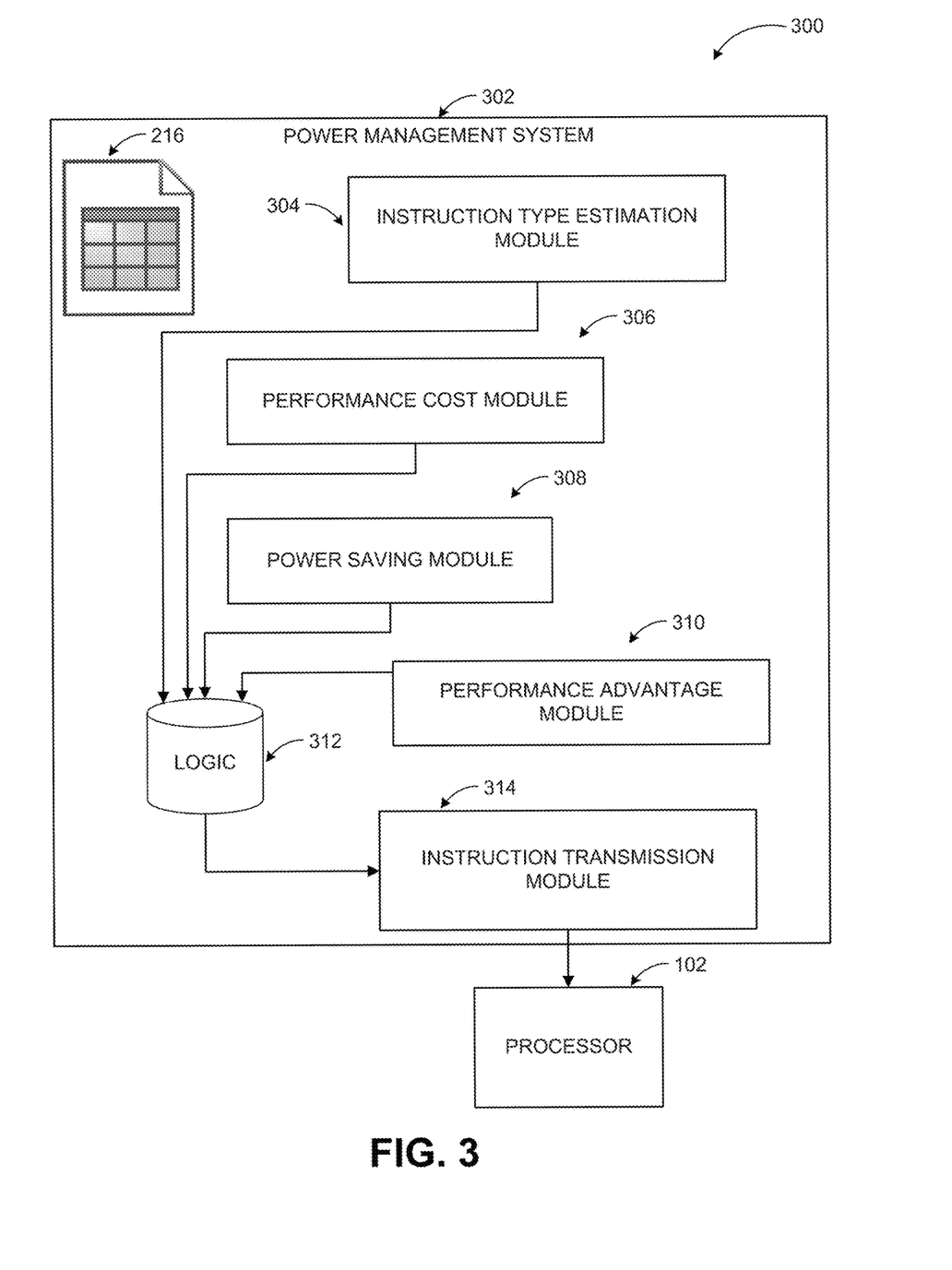
FIG. 3 illustrates an example component diagram of a power management system that provides a leakage current variability based power management.

FIG. 3 illustrates an example component diagram of a power management system that provides a leakage current variability based power management, arranged in accordance with at least some embodiments described herein.

As shown in a diagram 300, the micro-architectural leakage map 216 may be used for leakage power management using sub-unit gating at a power management system 302. An instruction type estimation module 304 may access stored or gathered estimates of the instruction types that are to be used by an application (e.g., in phase analysis, profiling, and/or core placement). A performance cost module 306 may generate estimates of the performance costs of powering down processor sub-units and of the leakage power that may be saved by deactivating each sub-unit. A power saving module 308 may compare whether power saved (known via the leakage map 216) is enough to justify the resulting performance decrease. A performance advantage module 310 may compare whether power-down leakage savings (available via the leakage map 216) may provide enough power to gain a performance advantage by speeding up other processing resources. The outputs may be subject to an "OR" logic 312 to determine if either answer is yes. If any of the comparisons are affirmative, an instruction transmission module 314 may react by sending sub-unit gating instructions to the processor 102 and the process begins again to plan power minimization for the next time period. If neither options is desirable (none of the comparisons are affirmative), the process may begin again at the instruction type estimation module 304 when an application or application state or other environmental condition has changed sufficiently to change the likely population of instruction types.

While the example operations of a power management system are described as being performed by individual modules above, some or all of the operations may be performed by fewer or additional modules. In some examples, all of the actions may be performed by a single module. Furthermore, a leakage map as discussed above may be used by systems other than power management. Any system may need processor sub-unit level power leakage information may utilize the leakage map data.

In some examples, it may be possible to mitigate a majority of the leakage power by managing a small group of the sub-units. For example, the leakage map may reduce the sub-unit power management problem to the management of a few "hot" sub-units that result in the most leakage. A system may then not consider the management of leakage power in the other sub-units, resulting in a reduction of the resources needed for power management strategy and data gathering.

The examples in FIGS. 1 through 3 have been described using specific systems and processes in which a leakage current variability based power management may be implemented. Embodiments for a power management system based on a leakage current variability are not limited to the systems and processes according to these examples.

Figure 4:
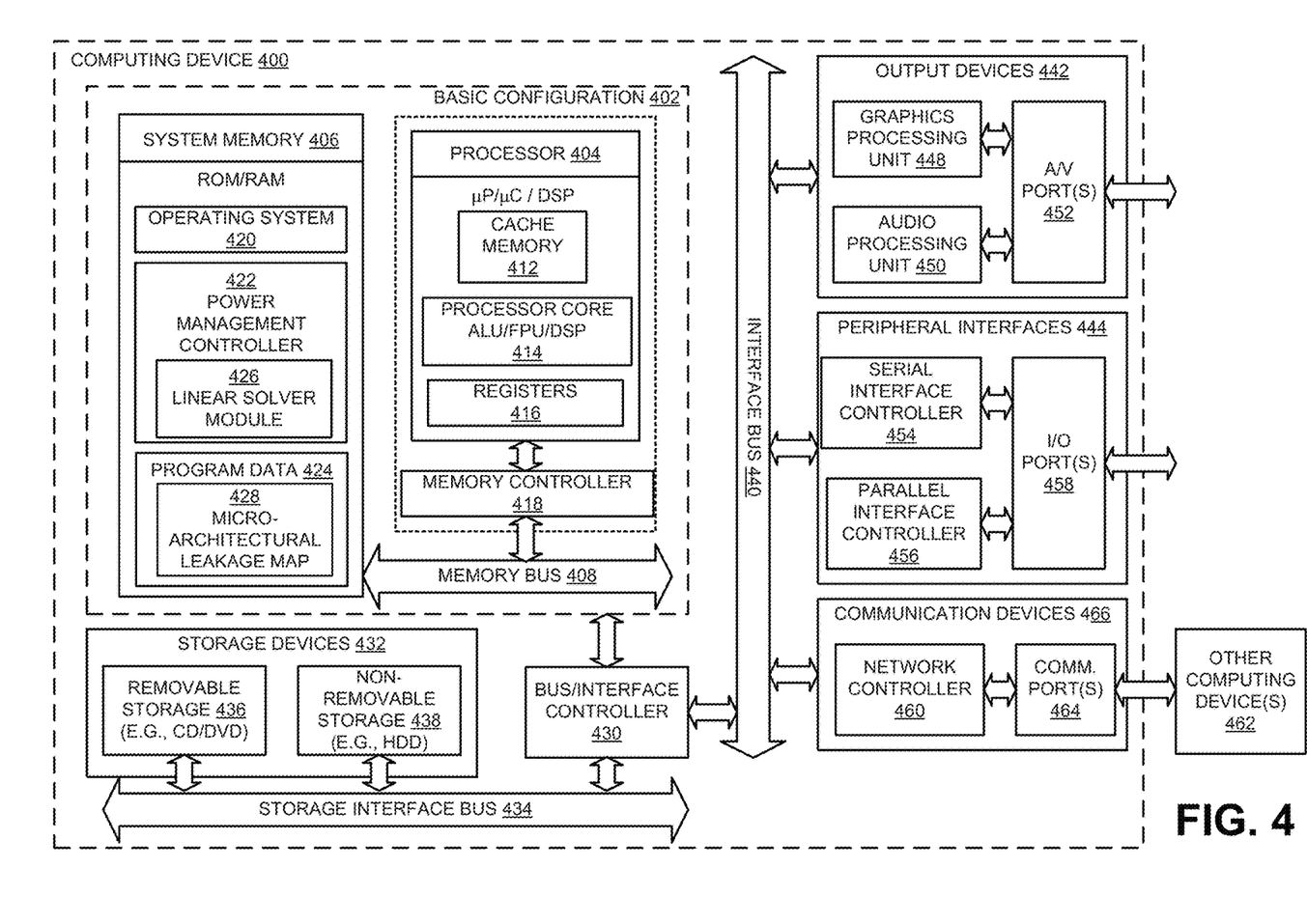
FIG. 4 illustrates a general purpose computing device, which may be used to provide a leakage current variability based power management.

FIG. 4 illustrates a general purpose computing device, which may be used to provide a leakage current variability based power management, arranged in accordance with at least some embodiments disclosed herein.

For example, a computing device 400 may be used to provide computer program products related to a leakage current variability based power management. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor ($\mu$P), a microcontroller ($\mu$C), a digital signal processor (DSP), or any combination thereof. The processor 404 may include one or more levels of caching, such as a cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.), or any combination thereof. The system memory 406 may include an operating system 420, data of a power management controller 422, and a program data 424. The power management controller 422 may include a linear solver module 426. The power management controller 422 may execute a power management application to determine a micro-architectural leakage map of the processor 404 to activate or deactivate one or more sub-units of one or more cores of the processor 404. The program data 424 may include, among other data, a micro-architectural leakage map 428, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices may include magnetic disk devices, such as flexible disk drives and hard-disk drives (HDDs), optical disk drives such as compact disc (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 406, the removable storage devices 436, and the non-removable storage devices 438 may be examples of computer storage media. Computer storage media may include, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 may include a graphics processing unit 448 and an audio processing unit 450, which may be configured to communicate to various external devices, such as a display or speakers via one or more A/V ports 452. One or more example peripheral interfaces 444 may include a serial interface controller 454 or a parallel interface controller 456, which may be configured to communicate with external devices, such as input devices (for example, keyboard, mouse, pen, voice input device, touch input device, etc.) or other peripheral devices (for example, printer, scanner, etc.) via one or more I/O ports 458. An example communication device 466 may include a network controller 460, which may be arranged to facilitate communications with one or more other computing devices 462 over a network communication link via one or more communication ports 464. The one or more other computing devices 462 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 400 may be implemented as a part of a general purpose or specialized server, mainframe, or similar computer, which includes any of the above functions. The computing device 400 may also be implemented as a personal computer including both laptop computer and non-laptop computer configurations.

Example embodiments may also include methods to provide a leakage current variability based power management. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 5:
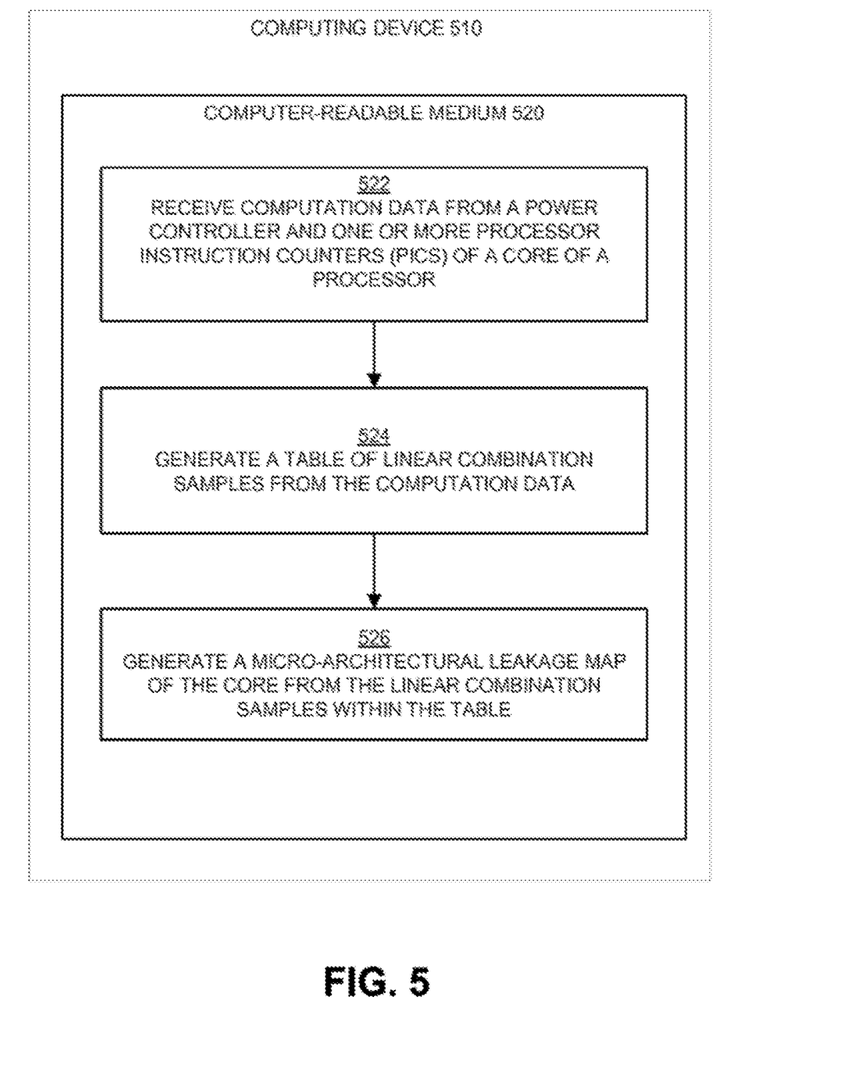
FIG. 5 is a flow diagram illustrating an example method to provide a leakage current variability based power management.

FIG. 5 is a flow diagram illustrating an example method to provide a leakage current variability based power management which may be implemented through the power inference system 202 and the PMS 302 which may be examples of the computing device 400, arranged in accordance with at least some embodiments disclosed herein.

Example methods may include one or more operations, functions, or actions as illustrated by one or more of blocks 522, 524, and 526, and may, in some embodiments, be performed by a computing device such as the computing device 400 in FIG. 4. The operations described in the blocks 522-530 may also be stored as computer-executable instructions in a computer-readable medium such as a computer-readable medium 520 of a computing device 510.

An example process for providing a leakage current variability based power management may begin with block 522, "RECEIVE COMPUTATION DATA FROM A POWER CONTROLLER AND ONE OR MORE PROCESSOR INSTRUCTION COUNTERS (PICS) OF A CORE OF A PROCESSOR," where the power inference system 202 may receive power consumption data from the power controller 204 and instructions from the PICS 206.

Block 522 may be followed by block 524, "GENERATE A TABLE OF LINEAR COMBINATION SAMPLES FROM THE COMPUTATION DATA," where the power inference system 202 may generate the table 210 from the linear combination samples.

Block 524 may be followed by block 526, "GENERATE A MICRO-ARCHITECTURAL LEAKAGE MAP OF THE CORE FROM THE LINEAR COMBINATION SAMPLES WITHIN THE TABLE," where the linear solver module 214 may generate the leakage map 216 from the table 210.

Figure 6:
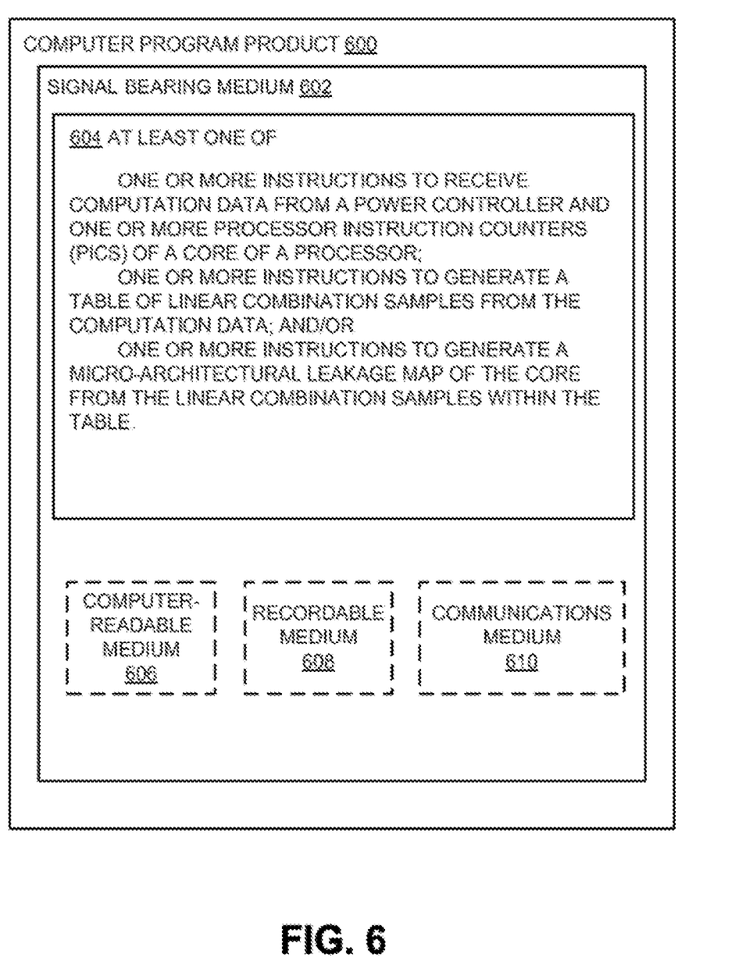
FIG. 6 illustrates a block diagram of an example computer program product to provide a leakage current variability based power management, all arranged in accordance with at least some embodiments described herein.

FIG. 6 illustrates a block diagram of an example computer program product to provide a leakage current variability based power management, arranged in accordance with at least some embodiments described herein.

In some examples, as shown in FIG. 6, a computer program product 600 may include a signal bearing medium 602 that may also include one or more machine readable instructions 604 that, when executed by, for example, a processor, may provide the functionality described herein. For example, referring to the processor 404 in FIG. 4, the power inference controller 424 and the linear solver module 426 may undertake one or more tasks shown in FIG. 6 in response to the instructions 604 conveyed to the processor 404 by the medium 602 to provide a leakage current variability based power management, as described herein. Some of those instructions may include, for example, receiving computation data from a power controller and one or more processor instruction counters (PICs) of a core of a processor, generating a table of linear combination samples from the computation data, and generating a micro-architectural leakage map of the core from the linear combination samples within the table.

In some implementations, the signal bearing medium 602 depicted in FIG. 6 may encompass a computer-readable medium 606, such as, but not limited to, a hard disk drive (HDD), a solid state drive (SSD), a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (e.g., a fiber optic cable, a waveguide, a wired communication link, a wireless communication link, etc.). For example, the computer program product 600 may be conveyed to one or more modules of the processor 404 by an RF signal bearing medium, where the signal bearing medium 602 is conveyed by the wireless communications medium 610 (e.g., a wireless communications medium conforming with the IEEE 802.11 standard).

According to some examples, methods to provide a leakage current variability based power management are described. An example method may include receiving computation data from a power controller and one or more processor instruction counters (PICs) of a core of a processor; generating a table of linear combination samples from the computation data; and generating a micro-architectural leakage map of the core from the linear combination samples within the table.

According to other examples, the method may further include storing a first set of values for a power and a usage of each one of one or more instructions executed at one of the linear combination samples, for each one of the linear combination samples; and storing the first set of values in a set of columns and a row of the table associated with a class for each one of the one or more instructions. The method may also include computing a second value of a consolidated power and a consolidated usage from the first set of values, for each one of the linear combination samples; and storing the second value within the row and a consolidated power column of the table, for each one of the linear combination samples.

According to further examples, the method may also include normalizing the second value to a decimal value, where a maximum value for the second value is 1. The method may yet include normalizing the first set of values to decimal values, where a maximum value for the first set of values is 1. The method may further include grouping the one or more instructions based on a sub-unit of the core associated with each one of the one or more instructions. The method may also include in response to a determination of a first number of equations associated with the linear combination samples within the table to exceed a second number of unknowns associated with the linear combination samples within the table, determining a completeness of the table to initiate a production of the micro-architectural leakage map.

According to yet other examples, the method may include generating the micro-architectural leakage map from the equations to illustrate an impact of a fabrication variability of the core that reflects an actual leakage of power of one or more sub-units of the core. The method may further include determining an estimate of instruction types of an application executed by the core. The method may include determining a performance cost to power down a sub-unit of the core based on an application of the estimate to the micro-architectural leakage map and in response to a determination that the performance cost is below a threshold, transmitting sub-unit gating instructions associated with the sub-unit to the core. The method may also include determining a power saving value associated with a power down of a sub-unit of the core based on the micro-architectural leakage map and in response to a determination that the power saving value exceeds a threshold, transmitting sub-unit gating instructions associated with the sub-unit to the core. The method may yet include determining a performance advantage value associated with a power down of a sub-unit of the core based on the micro-architecture leakage map and in response to a determination that the performance advantage exceeds a threshold, transmitting sub-unit gating instructions associated with the sub-unit to the core.

According to other examples, a system to provide a leakage current variability based power management is described. The system may include a memory and a processor coupled to the memory, where the processor includes one or more cores and is configured to execute a power management application in conjunction with instructions stored in the memory. The power management application may be configured to: receive computation data from a power controller and one or more processor instruction counters (PIC) of one of the one or more cores of the processor; generate a table of linear combination samples from the computation data, where the one or more instructions are grouped based on a sub-unit of the core associated with each one of the one or more instructions; and generate a micro-architectural leakage map of the core from the linear combination samples within the table. The power management application may reside on the same processor whose power is being managed. Alternatively, the power management application may be executed on another server or another processor. For example, a group of processors may send their power data to the power management application that may reside on a centralized server or processor.

According to some examples, the power management application may be further configured to: store a first set of values for a power and a usage of each one of one or more instructions executed at one of the linear combination samples, for each one of the linear combination samples; store the first set of values in a set of columns and a row of the table associated with a class for each one of the one or more instructions; compute a second value of a consolidated power and a consolidated usage from the first set of values, for each one of the linear combination samples; and store the second value within the row and a consolidated power column of the table, for each one of the linear combination samples.

According to other examples, the power management application may be further configured to normalize the first set of values and the second value to a decimal value, where a maximum value for each one of the first set of values and the second value is 1. The power management application may also be configured to: in response to a determination of a first number of equations associated with the linear combination samples within the table to exceed a second number of unknowns associated with the linear combination samples within the table, determine a completeness of the table to initiate a production of the micro-architectural leakage map; and generate the micro-architectural leakage map from the equations to illustrate an impact of a fabrication variability of the core that reflects an actual leakage of power of one or more sub-units of the core.

According to yet other examples, the power management application may be further configured to: determine an estimate of instruction types of an application executed by the core; determine a performance cost to power down the sub-unit of the core based on the estimate applied to the micro-architectural leakage map; and in response to a determination that the performance cost is below a threshold, transmit sub-unit gating instructions associated with the sub-unit to the core. The power management application may also determine a power saving value associated with a power down of the sub-unit of the core based on the micro-architectural leakage map and in response to a determination that the power saving value exceeds a threshold, transmit sub-unit gating instructions associated with the sub-unit to the core. The power management application may further determine a performance advantage value associated with a power down of the sub-unit of the core based on the micro-architecture leakage map; and in response to a determination that the performance advantage exceeds a threshold, transmit sub-unit gating instructions associated with the sub-unit to the core.

According to further examples, a non-transitory computer-readable storage medium with instructions stored thereon to provide a leakage current variability based power management is described. The instructions, in response to execution by a processor, may cause the processor to: receive computation data from a power controller and one or more processor instruction counters (PIC) of one of the one or more cores of the processor; generate a table of linear combination samples from the computation data, where the one or more instructions are grouped based on a sub-unit of the core associated with each one of the one or more instructions; and generate a micro-architectural leakage map of the core from the linear combination samples within the table.

According to some examples, the instructions may further cause the processor to: determine an estimate of instruction types of an application executed by the core; determine a performance cost to power down the sub-unit of the core based on the estimate applied to the micro-architectural leakage map; and in response to a determination that the performance cost is below a threshold, transmit sub-unit gating instructions associated with the sub-unit to the core. The instructions may also cause the processor to: determine a power saving value associated with a power down of the sub-unit of the core based on the micro-architectural leakage map; and in response to a determination that the power saving value exceeds a threshold, transmit sub-unit gating instructions associated with the sub-unit to the core. The instructions may further cause the processor to: determine a performance advantage value associated with a power down of the sub-unit of the core based on the micro-architecture leakage map; and in response to a determination that the performance advantage exceeds a threshold, transmit sub-unit gating instructions associated with the sub-unit to the core.

There is little distinction left between hardware and software implementations of aspects of systems; the use of hardware or software is generally (but not all of the time, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof, as understood by a person having ordinary skill in the art. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of the disclosure.

The present disclosure is not to be limited in terms of the particular embodiments described in the application, which are intended as illustrations of various aspects. Many modifications and variations may be made without departing from the spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited by the terms of the appended claims, along with the full scope of equivalents to which such claims are entitled. It is to be understood that the disclosure is not limited to particular methods, reagents, compounds compositions or biological systems, which may, of course, vary. It is also to be understood that the terminology used herein is for the purpose of describing particular embodiments, and is not intended to be limiting.

In addition, those skilled in the art will appreciate that the mechanisms of the subject matter described herein are capable of being distributed as a program product in a variety of forms and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SDD), etc., and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and application programs, one or more interaction devices, such as a touch pad or screen, and/or control systems including feedback loops and control motors (for example, feedback for sensing position and/or velocity of gantry systems; control motors for moving and/or adjusting components and/or quantities).

A system may be implemented using any suitable commercially available components, such as those found in data computing/communication and/or network computing/communication systems. The herein described subject matter sometimes illustrates different components contained within, or connected with, other different components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include, but are not limited to, physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or the application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

As will be understood by one skilled in the art, for any and all purposes, such as in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like include the number recited and refer to ranges which may be subsequently broken down into subranges as discussed above. Finally, as will be understood by one skilled in the art, a range includes each individual member. For example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to provide a leakage current variability based power management, the method comprising:
   receiving computation data from a power controller and one or more processor instruction counters (PICs) of a core of a processor that executes one or more instructions;
   generating a table of linear combination samples from the computation data, wherein each of the linear combination samples includes a power usage value for a sub-unit of the core;
   generating a micro-architectural leakage map of the core from the linear combination samples within the table, wherein the one or more instructions are grouped based on one or more sub-units of the core associated with each one of the one or more instructions;
   in response to detection that a second sub-unit is deactivated based on the micro-architectural leakage map, directing a thread of a subset of the one or more instructions to a first sub-unit;
   in response to detection that the first sub-unit is unable to compensate the deactivation of the second sub-unit, reactivating the second sub-unit;
   executing a thread migration operation to move the thread from the first sub-unit to the second sub-unit, the thread to be executed by the second sub-unit; and
   in response to a completion of an execution of the thread; moving the thread back to the first sub-unit, and deactivating the second sub-unit.

2. The method of claim 1, further comprising:
   storing a first set of values for a power and a usage of each one of the one or more instructions executed at one of the linear combination samples, for each one of the linear combination samples; and
   storing the first set of values in a set of columns and a row of the table associated with a class for each one of the one or more instructions.

3. The method of claim 2, further comprising:
   computing a second value of a consolidated power and a consolidated usage from the first set of values, for each one of the linear combination samples; and
   storing the second value within the row and a consolidated power column of the table, for each one of the linear combination samples.

4. The method of claim 3, further comprising:
   normalizing the second value to a decimal value, wherein a maximum value for the second value is 1.

5. The method of claim 2, further comprising:
   normalizing the first set of values to decimal values, wherein a maximum value for the first set of values is 1.

6. The method of claim 1, further comprising:
   in response to a determination of a first number of equations associated with the linear combination samples within the table to exceed a second number of unknowns associated with the linear combination samples within the table, determining a completeness of the table to initiate a production of the micro-architectural leakage map.

7. The method of claim 6, further comprising:
   generating the micro-architectural leakage map from the equations to illustrate an impact of a fabrication variability of the core that reflects an actual leakage of power of the one or more sub-units of the core.

8. The method of claim 1, further comprising:
   determining an estimate of instruction types of an application executed by the core.

9. The method of claim 8, further comprising:
   determining a performance cost to power down the second sub-unit from the one or more sub-units of the core based on an application of the estimate to the micro-architectural leakage map; and
   in response to a determination that the performance cost is below a threshold, transmitting sub-unit gating instructions associated with the second sub-unit to the core.

10. The method of claim 1, further comprising:
    determining a power saving value associated with a power down of the second sub-unit from the one or more sub-units of the core based on the micro-architectural leakage map; and
    in response to a determination that the power saving value exceeds a threshold, transmitting sub-unit gating instructions associated with the second sub-unit to the core.

11. The method of claim 1, further comprising:
    determining a performance advantage value associated with a power down of the second sub-unit of the core based on the micro-architecture leakage map; and
    in response to a determination that the performance advantage value exceeds a threshold, transmitting sub-unit gating instructions associated with the second sub-unit to the core.

12. A system to provide a leakage current variability based power management, the system comprising:
    a memory; and
    a processor coupled to the memory, wherein the processor includes one or more cores and is configured to execute a power management application in conjunction with one or more instructions stored in the memory, wherein the power management application is configured to:

receive computation data from a power controller and one or more processor instruction counters (PIC) of one of the one or more cores of the processor;

generate a table of linear combination samples from the computation data, wherein the one or more instructions are grouped based on one or more sub-units of a selected core associated with each one of the one or more instructions, and wherein each of the linear combination samples include a power usage value for a sub-unit of the selected core;

generate a micro-architectural leakage map of the selected core from the linear combination samples within the table;

in response to detection that a second sub-unit being deactivated based on the micro-architectural leakage map, direct a thread of a subset of the one or more instructions to a first sub-unit;

in response to detection that the first sub-unit is unable to compensate the deactivation of the second sub-unit, reactivate the second sub-unit;

execute a thread migration operation to move the thread from the first sub-unit to the second sub-unit, the thread to be executed by the second sub-unit; and in response to a completion of an execution of the thread; move the thread back to the first sub-unit, and deactivate the second sub-unit.

13. The system according to claim 12, wherein the power management application is further configured to:
store a first set of values for a power and a usage of each one of the one or more instructions executed at one of the linear combination samples, for each one of the linear combination samples;
store the first set of values in a set of columns and a row of the table associated with a class for each one of the one or more instructions;
compute a second value of a consolidated power and a consolidated usage from the first set of values, for each one of the linear combination samples; and
store the second value within the row and a consolidated power column of the table, for each one of the linear combination samples.

14. The system according to claim 13, wherein the power management application is further configured to:
normalize the first set of values and the second value to a decimal value, wherein a maximum value for each one of the first set of values and the second value is 1.

15. The system according to claim 12, wherein the power management application is configured to:
in response to a determination of a first number of equations associated with the linear combination samples within the table to exceed a second number of unknowns associated with the linear combination samples within the table, determine a completeness of the table to initiate a production of the micro-architectural leakage map; and
generate the micro-architectural leakage map from the equations to illustrate an impact of a fabrication variability of the core that reflects an actual leakage of power of the second sub-unit from the one or more sub-units of the core.

16. The system according to claim 12, wherein the power management application is further configured to:
determine an estimate of instruction types of an application executed by the core;

determine a performance cost to power down the second sub-unit from the one or more sub-units of the core based on the estimate applied to the micro-architectural leakage map; and
in response to a determination that the performance cost is below a threshold, transmit sub-unit gating instructions associated with the second sub-unit to the core.

17. The system according to claim 12, wherein the power management application is further configured to:
determine a power saving value associated with a power down of the second sub-unit from the one or more sub-units of the core based on the micro-architectural leakage map; and
in response to a determination that the power saving value exceeds a threshold, transmit sub-unit gating instructions associated with the second sub-unit to the core.

18. The system according to claim 12, wherein the power management application is further configured to:
determine a performance advantage value associated with a power down of the second sub-unit from the one or more sub-units of the core based on the micro-architecture leakage map; and
in response to a determination that the performance advantage value exceeds a threshold, transmit sub-unit gating instructions associated with the second sub-unit to the core.

19. A non-transitory computer-readable storage medium with
instructions stored thereon to provide a leakage current variability based power management, the instructions, in response to execution by a processor, cause the processor to:
receive computation data from a power controller and one or more processor instruction counters (PIC) of one of one or more cores of the processor that executes one or more instructions;
generate a table of linear combination samples from the computation data, wherein the one or more instructions are grouped based on a sub-unit of the core associated with each one of the one or more instructions, and wherein each of the linear combination samples include a power usage value for the sub-unit of the core
generate a micro-architectural leakage map of the core from the linear combination samples within the table;
in response to detection that a second sub-unit being deactivated based on the micro-architectural leakage map, direct a thread of a subset of the one or more instructions to a first sub-unit;
in response to detection that the first sub-unit is unable to compensate the deactivation of the second sub-unit, reactivate the second sub-unit;
execute a thread migration operation to move the thread from the first sub-unit to the second sub-unit, the thread to be executed by the second sub-unit; and
in response to a completion of an execution of the thread; move the thread back to the first sub-unit, and deactivate the second sub-unit.

20. The non-transitory computer-readable storage medium of claim 19, wherein the instructions further cause the processor to:
determine an estimate of instruction types of an application executed by the core;
determine a performance cost to power down the second sub-unit of the core based on the estimate applied to the micro-architectural leakage map; and in response to a determination that the performance cost is below a threshold, transmit sub-unit gating instructions associated with the second sub-unit to the core.

21. The non-transitory computer-readable storage medium of claim 19, wherein the instructions further cause the processor to:

determine a power saving value associated with a power down of the second sub-unit of the core based on the micro-architectural leakage map; and in response to a determination that the power saving value exceeds a threshold, transmit sub-unit gating instructions associated with the second sub-unit to the core.

22. The non-transitory computer-readable storage medium of claim 19, wherein the instructions further cause the processor to:

determine a performance advantage value associated with a power down of the second sub-unit of the core based on the micro-architecture leakage map; and in response to a determination that the performance advantage value exceeds a threshold, transmit sub-unit gating instructions associated with the second sub-unit to the core.

\* \* \* \* \*

UNITED STATES PATENT AND TRADEMARK OFFICE
CERTIFICATE OF CORRECTION

| | | |
|---|---|---|
| PATENT NO. | : 9,671,850 B2 | Page 1 of 1 |
| APPLICATION NO. | : 14/325280 | |
| DATED | : June 6, 2017 | |
| INVENTOR(S) | : Kruglick | |

It is certified that error appears in the above-identified patent and that said Letters Patent is hereby corrected as shown below:

In Column 15, Lines 60-61, in Claim 1, delete "thread; moving" and insert -- thread: moving --, therefor.

In Column 17, Lines 25-26, in Claim 12, delete "thread; move" and insert -- thread: move --, therefor.

In Column 18, Lines 57-58, in Claim 19, delete "thread; move" and insert -- thread: move --, therefor.

Signed and Sealed this
Nineteenth Day of September, 2017

Joseph Matal
*Performing the Functions and Duties of the
Under Secretary of Commerce for Intellectual Property and
Director of the United States Patent and Trademark Office*